United States Patent
Yu

(10) Patent No.: US 10,351,205 B2
(45) Date of Patent: Jul. 16, 2019

(54) ARTICLES FOR HOLDING OR RESTING

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/626,571

(22) Filed: Jun. 19, 2017

(65) Prior Publication Data
US 2018/0029664 A1 Feb. 1, 2018

(30) Foreign Application Priority Data
Jul. 27, 2016 (TW) .............................. 105123740 A

(51) Int. Cl.
*B62K 21/26* (2006.01)
*F16F 1/376* (2006.01)
*B62K 21/12* (2006.01)
*B62K 23/06* (2006.01)

(52) U.S. Cl.
CPC ............ *B62K 21/26* (2013.01); *B62K 21/125* (2013.01); *B62K 23/06* (2013.01); *F16F 1/376* (2013.01); *F16F 2230/0035* (2013.01); *Y10T 16/466* (2015.01); *Y10T 74/20828* (2015.01)

(58) Field of Classification Search
CPC . B62K 21/125; B62K 21/26; Y10T 74/20822; Y10T 74/20828; Y10T 74/2087; Y10T 74/20876; Y10T 16/466; Y10T 16/48; Y10T 16/498; B25G 1/01; B25G 1/02; B25G 1/102; B25G 1/12

USPC .............................................. 74/551.8, 551.9
See application file for complete search history.

(56) References Cited

U.S. PATENT DOCUMENTS

| | | | | |
|---|---|---|---|---|
| 4,308,762 A | * | 1/1982 | Jannard | B62K 21/26 16/421 |
| 4,416,166 A | * | 11/1983 | Jannard | B62K 21/26 16/421 |
| 4,895,044 A | | 1/1990 | Ekins | |
| D311,676 S | * | 10/1990 | Neal | D8/303 |
| D324,478 S | * | 3/1992 | Baer | 74/551.9 |
| 5,857,387 A | * | 1/1999 | Larson | B62K 21/26 74/489 |
| 2007/0113380 A1 | * | 5/2007 | Lee | A45B 9/02 16/431 |

* cited by examiner

*Primary Examiner* — Prasad V Gokhale
(74) *Attorney, Agent, or Firm* — Browdy and Neimark, PLLC

(57) ABSTRACT

An article includes a body having at least a holding or resting surface, and a plurality of spaced-apart fine pillars made of a resilient and deformable plastic material and projected from the holding or resting surface of the body. Each of the spaced-apart fine pillars includes a body portion with a bore defining a longitudinal axis, a base end and a free end. The base end of the fine pillar is integrally connected with the holding or resting surface the body. The body portion of the fine pillar extends from the base end along the longitudinal axis to the free end in a predetermined height. The fine pillars can be able to deform elastically when subjected to even a minimum pressure to provide the anti-skidding, shock-absorbing and breathable capacities.

9 Claims, 7 Drawing Sheets bicycle according to a first embodiment of the present invention;

ARTICLES FOR HOLDING OR RESTING

BACKGROUND OF THE INVENTION

1. Field of the Invention

The present invention relates generally to an article for holding or resting, and more particularly, to an article with a surface configured to provide anti-skidding, shock-absorbing or breathable efficacies when being held or rested thereon by a user.

2. Description of the Related Art

In the prior art known, U.S. Pat. No. 4,308,762 discloses a hand grip with an outer surface incorporating a large number of protrusions to define a tread to aid in manual grasping of the grip. In addition, U.S. Pat. No. 4,895,044 discloses another hand grip, which has a peripheral outer surface provided with a plurality of knurls and ribs to improve the user's hold on the grip. Although improving the user's hold or grasping thereon, these prior art grips cannot provide anti-skidding, shock-absorbing and breathable capacities simultaneously. Accordingly, there is a continuing need for an article which is of anti-skidding, shock-absorbing and breathable capacities simultaneously when being held or rested by a user.

SUMMARY OF THE INVENTION

Therefore, the present invention is directed to providing an article which has at least a surface with numerous fine pillars arranged in high density, so that when being held or rested by a user, it is capable of providing anti-skidding, shock-absorbing and breathable capacities simultaneously.

One advantage of the article according to the present invention is that it has a multi-directional anti-skidding effect.

Therefore, it is an aspect of the present invention to provide an article for holding or resting which comprises a body having at least a holding or resting surface, and a plurality of closely spaced-apart fine pillars made of a resilient and deformable plastic material and projected from the holding or resting surface of the body. Each of the closely spaced-apart fine pillars has a body portion with a longitudinal axis, a base end and a free end. The base end of the fine pillar is integrally connected with the holding or resting surface of the body. The body portion extends from the base end along the longitudinal axis thereof to the free end in a predetermined height.

The article according to the present invention is also characterized in that the body portion of the fine pillar has a bore extending along the longitudinal axis thereof.

The article according to the present invention is also characterized in that the free end of the fine pillar has a flat end face.

The article according to the present invention is also characterized in that the fine pillars have a uniform height.

The article according to the present invention is also characterized in that the outer diameter of the body portion of the fine pillar is equal to or less than the height of the body portion of the fine pillar.

BRIEF DESCRIPTION OF THE DRAWINGS

Further characteristics and advantages of the present invention will be apparent from the description of some preferred but non-exclusive embodiments of the present invention, illustrated by way of non-limiting example in the accompanying drawings, in which.

DETAILED DESCRIPTION OF THE MENTION

Figure 1:
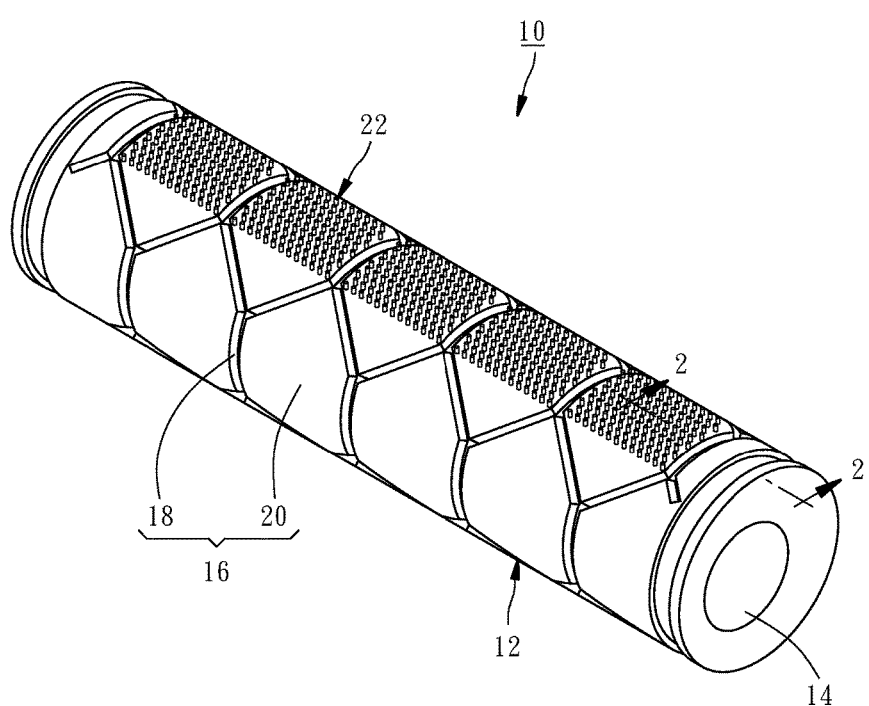
FIG. 1 shows a perspective view of a handlebar grip for a bicycle according to a first embodiment of the present invention.

Referring firstly to FIGS. 1 to 4, a handlebar grip 10 according to a first embodiment of the present invention will be described. The handlebar grip 10 is integrally made from a flexible and deformable thermoplastic material, such as thermoplastic rubber and includes a body 12 and a plurality of closely spaced-apart fine pillars 22 integrally formed with the body 12 to define a tread to aid in holding of the handlebar grip 10. The body 12 has a through hole 14 for being fitted onto and over the end of a bicycle handle and a holding surface 16 with multi-hexahedral regions 20 defined by a plurality of grooves 18. The fine pillars 22 are disposed on each of the hexahedral regions 20.

Figure 2:
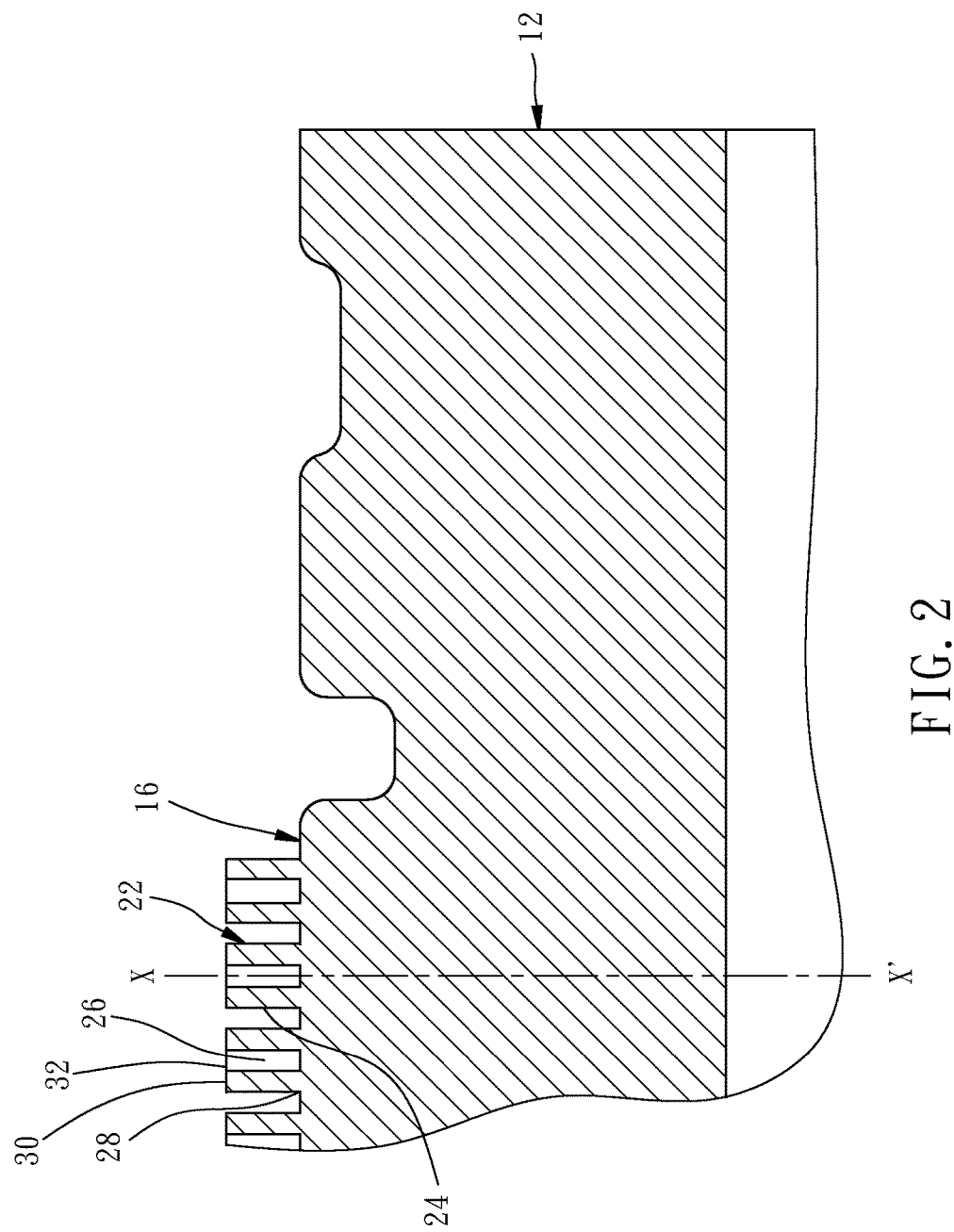
FIG. 2 shows an enlarged cross-sectional view taken along the lines 2-2 of FIG. 1.

Each of the fine pillars 22 is shaped as a cylinder or other shapes such as a truncated cone. To be more precisely, as shown in FIG. 2, each of the fine pillars 22 has a body portion 24 with a bore 26 defining a longitudinal axis X-X', a base end 28 integrally connected with the holding surface 16 of the handlebar grip 10, and a free end 30 with a flat end face. The body portion 24 extends from the base end 28 along the longitudinal axis X-X' to the free end 30 in a predetermined height. The bore 26 has an opening at the free end 30.

In this embodiment, the height of the body portion 24 is about 1.5 mm, the outer diameter of the body portion 24 is about 1.5 mm, the inner diameter of the bore 26 is about 0.5 mm, and each of the fine pillars 22 is respectively spaced apart by 0.5 mm, so that the fine pillars 22 can be able to deform elastically when subjected to even a minimum pressure to provide the anti-skidding, shock-absorbing and breathable capacities.

Figure 3:
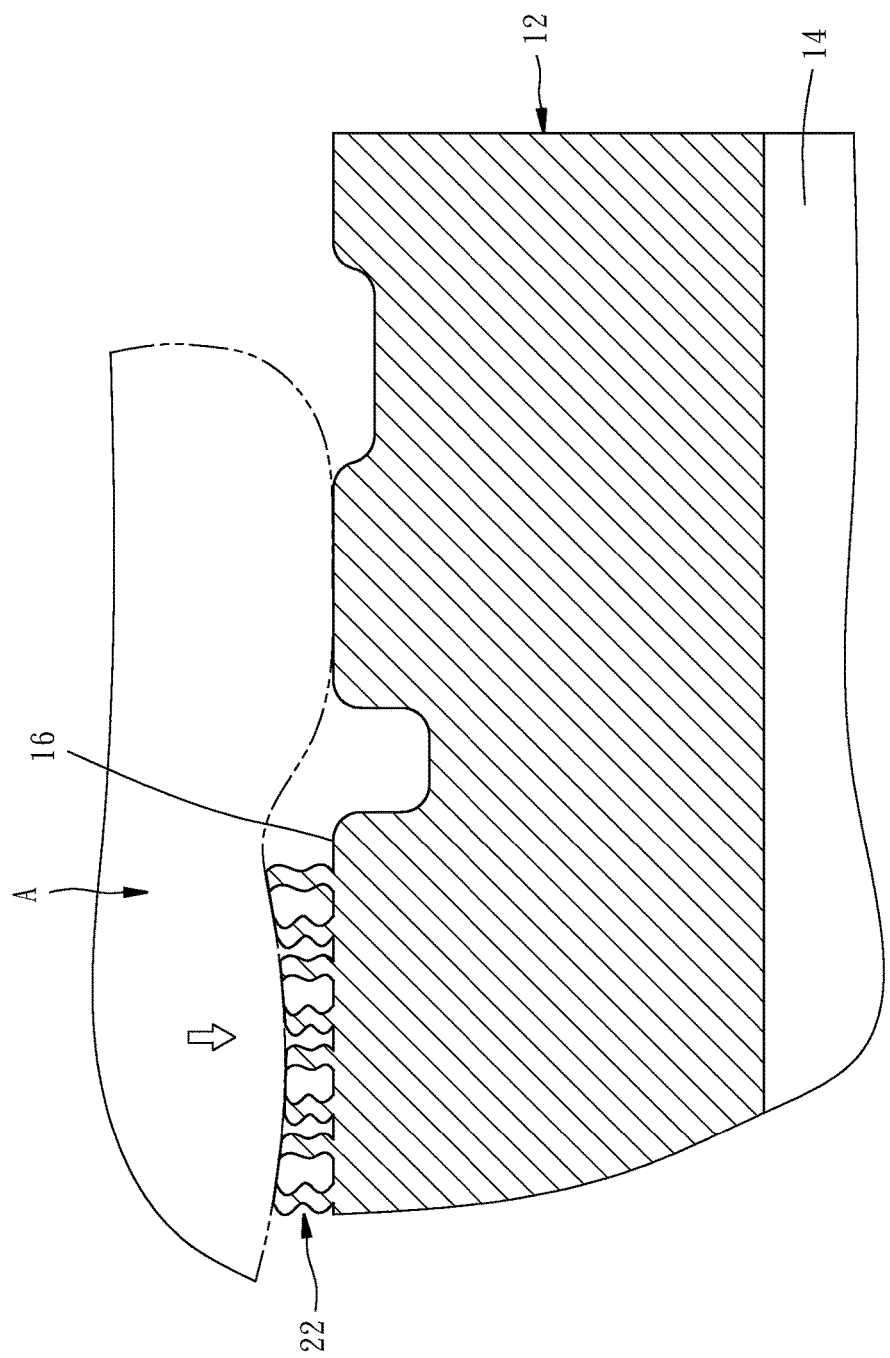
FIG. 3 is a schematic view showing the operation of the fine pillars of the handlebar grip when being held by a user.
Figure 4:
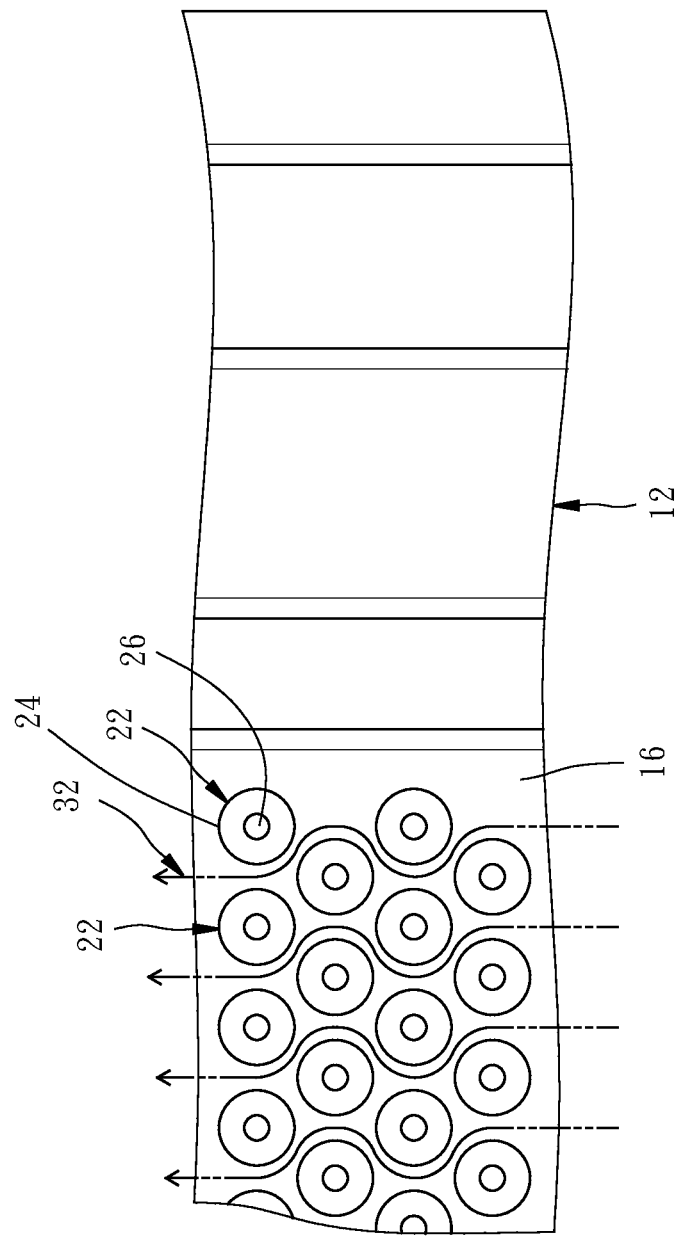
FIG. 4 shows a partially top view of the holding surface of the handlebar grip from which the fine pillars projecting.

As shown in FIG. 3, when the fine pillars 22 are stressed by a considerable force indicated by the arrow, such as the gripping force exerted on the holding surface 16 of the handlebar grip 10 by a bicycle rider's hand A during riding, elastic deformation of the fine pillars 22 should take place to produce the anti-skidding and shock-absorbing efficacies. Further, as shown in FIG. 4, since each of the fine pillars 22 is substantially spaced-apart, a plurality of air passages 32 are formed to produce the breathable capacity.

Figure 5:
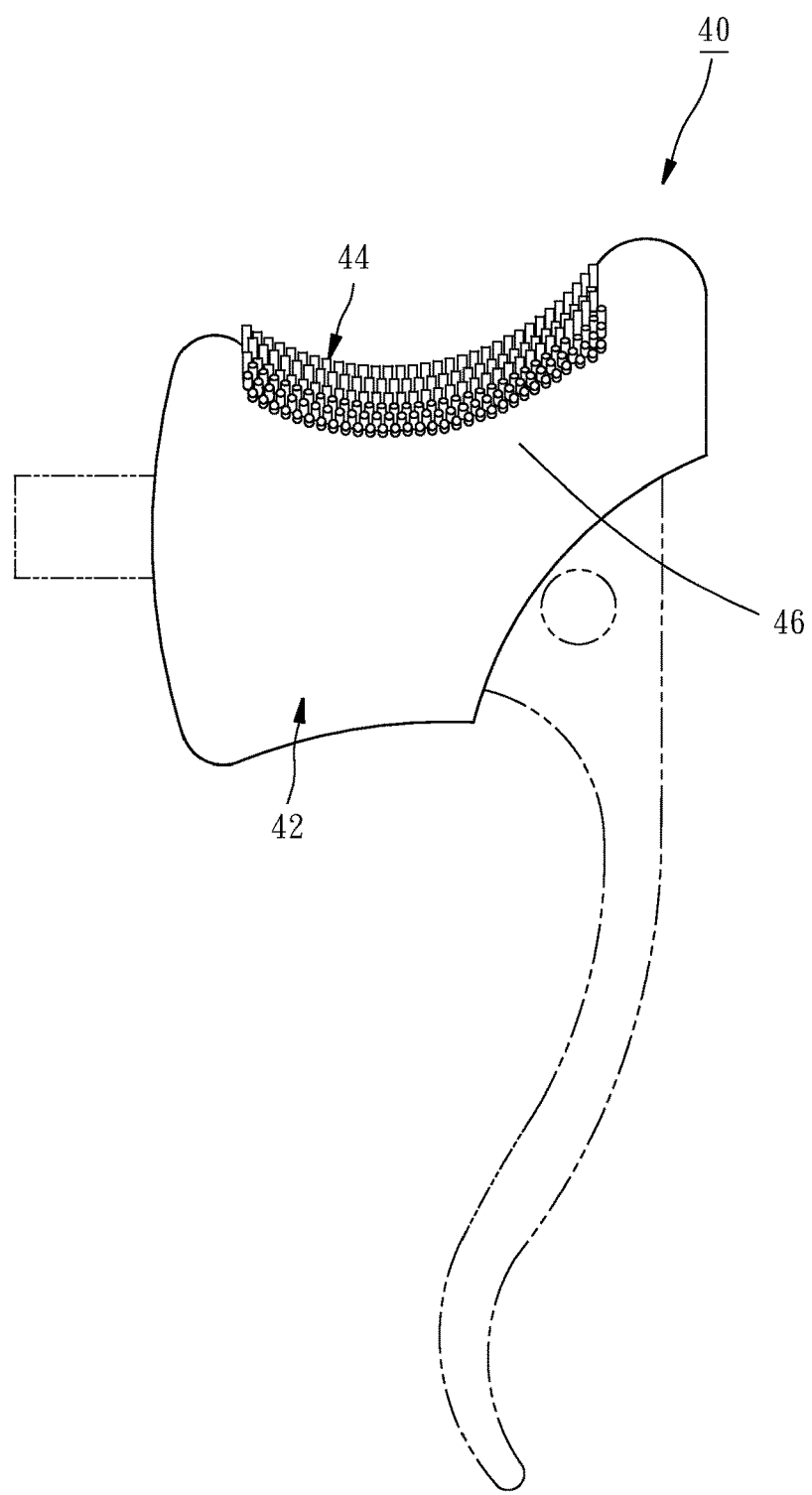
FIG. 5 is a side view of a brake lever hood for a bicycle according to a second embodiment of the present invention.
Figure 6:
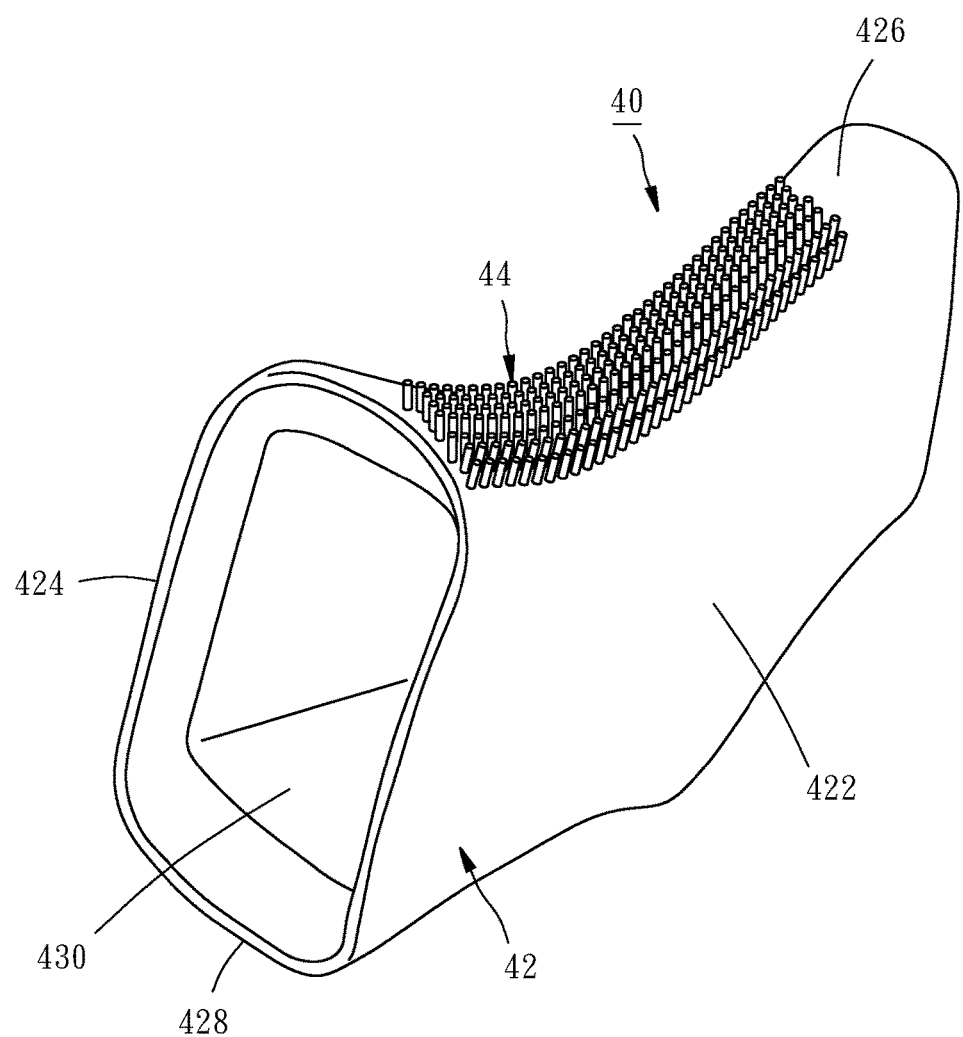
FIG. 6 is a perspective view of the brake lever hood shown in FIG. 5.

A second embodiment of the present invention, as shown in FIGS. 5 and 6, is a brake lever hood 40 configured to receive a bicycle break lever or the like indicated by the dashed line in FIG. 5. The brake lever hood 40 is integrally made a flexible and deformable thermoplastic material, such as thermoplastic rubber and includes an annular member 42 and a plurality of closely spaced apart fine pillars 44. The annular member 42 has an outer side surface 422, an inner side surface 424, a top surface 426 and a bottom surface 428 for defining an inner cavity 430 to receive a bicycle break lever or the like. The fine pillars 44 are integrally formed with the top surface 426 and have the same construction as the fine pillars 22 of the handlebar grip 10.

Figure 7:
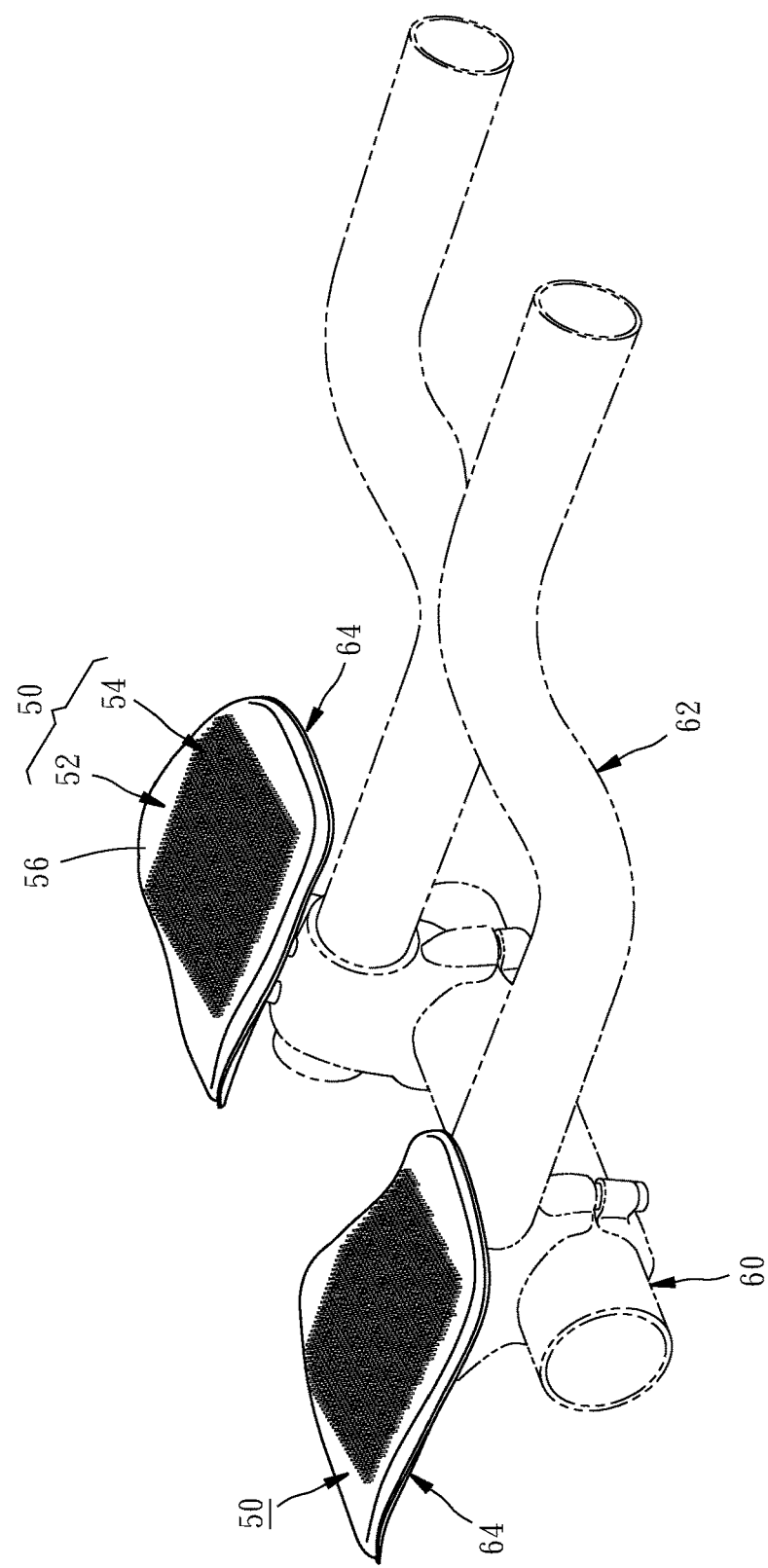
FIG. 7 is a perspective view of a forearm resting pad for a bicycle according to a third embodiment of the present invention.

A third embodiment of the present invention, as shown in FIG. 7, is a forearm resting pad 50. A conventional handlebar 60 of a racing type bicycle generally has an auxiliary handlebar 62 and a pair of arm rests 64 mounted thereon. The forearm resting pad 50 is also made from a flexible and deformable thermoplastic material, such as thermoplastic rubber and is mounted upon each of the arm rests 64. The pad 50 has a plate-like member 52 and a plurality of closely spaced apart fine pillars 54 integrally formed with a top resting surface 56 of the plate-like member 52 and configured as the fine pillars 22 of the handlebar grip 10.

What is claimed is:

1. An article, comprising:
a body having at least a holding or resting surface;
a plurality of fine pillars made of a resilient and deformable plastic material and projected from the holding or resting surface of the body;
each of the fine pillars being about 0.5 mm apart from one another;
each of the fine pillars having a body portion with a bore defining a longitudinal axis, a base end, and a free end with an opening;
an outer diameter of the body portion being about 1.5 mm;
an inner diameter of the body portion being about 0.5 mm;
the base end integrally connected with the holding or resting surface; and
the body portion having a height that is about 1.5 mm.

2. The article of claim 1, wherein the free end of each of the pillars has a flat end face.

3. The article of claim 1, wherein each of the fine pillars is shaped as a truncated cone.

4. The article of claim 1, wherein each of the fine pillars is shaped as a cylinder.

5. The article of claim 1, wherein the body includes a tube including a through hole.

6. The article of claim 1, wherein the body includes an annular member having an outer side surface, an inner side surface, a top surface and a bottom surface for defining an inner cavity to receive a bicycle break lever or the like.

7. The article of claim 6, wherein the fine pillars are projected from the top surface of the annular member.

8. The article of claim 1, wherein the body includes a plate-shaped member having a top resting surface.

9. The article of claim 8, wherein the fine pillars are projected from the top resting surface of the plate-like member.

* * * * *